United States Patent [19]

Maurer

[11] Patent Number: 5,150,411
[45] Date of Patent: Sep. 22, 1992

[54] CRYPTOGRAPHIC SYSTEM ALLOWING ENCRYPTED COMMUNICATION BETWEEN USERS WITH A SECURE MUTUAL CIPHER KEY DETERMINED WITHOUT USER INTERACTION

[75] Inventor: Ueli Maurer, Wil, Switzerland

[73] Assignee: Omnisec, Regensdorf, Switzerland

[21] Appl. No.: 641,742

[22] Filed: Jan. 16, 1991

[30] Foreign Application Priority Data

Oct. 24, 1990 [EP] European Pat. Off. ......... 90120365.3

[51] Int. Cl.$^5$ ............................................. H04L 9/30
[52] U.S. Cl. ...................................... 380/30; 380/21; 380/44; 380/49
[58] Field of Search ................. 380/30, 44, 46, 20, 380/23, 25, 49, 21

[56] References Cited

U.S. PATENT DOCUMENTS

| | | | |
|---|---|---|---|
| 4,633,037 | 12/1986 | Serpell | 380/44 X |
| 4,876,716 | 10/1989 | Okamoto | 380/30 X |
| 4,944,007 | 7/1990 | Austin | 380/30 X |
| 4,956,863 | 9/1990 | Goss | 380/30 |

OTHER PUBLICATIONS

*Cryptography, A Primer*, by Alan G. Konheim; (John Wiley & Sons, Inc.; 1981; pp. 294-329).
*Cryptography; A New Dimension in Computer Data Security*, by C. H. Meyer et al; (John Wiley & Sons, Inc.; 1982; pp. 32-41).

Primary Examiner—Bernarr E. Gregory
Attorney, Agent, or Firm—Egli International

[57] ABSTRACT

A secret key generator for a trusted authority means in a cryptographic system comprising means for receiving a publicly-known user identity $ID_A$ for a user A; and further comprising secret key generator means for transforming the publicly-known user identity $ID_A$ into secret key $s_A$ for the user A with the inverse of the exponentiation function $$a^{s_A} \equiv (ID_A)^2 \pmod{m},$$

that is solved for $s_A$, where a is a publicly-known base parameter, where m is a publicly-known modulus parameter and $m = p_1 * p_2 * \ldots * p_r$ and where $p_1, p_2, \ldots, p_r$ are secret system prime numbers. The inverse of the exponentiation function is infeasible to compute in order to calculate the secret key $s_A$ without knowing the prime numbers $p_1, p_2, \ldots, p_r$. The secret key $s_A$ enables user A to communicate securely to a user B having publicly-known user identity $ID_B$ with a mutual secure cipher key $K_{AB}$, defined by the equation:

$$K_{AB} \equiv (ID_B)^{2s_A} \pmod{m}.$$

The mutual secure cipher key $K_{AB}$ is determined without previous interaction with the user B.

32 Claims, 1 Drawing Sheet

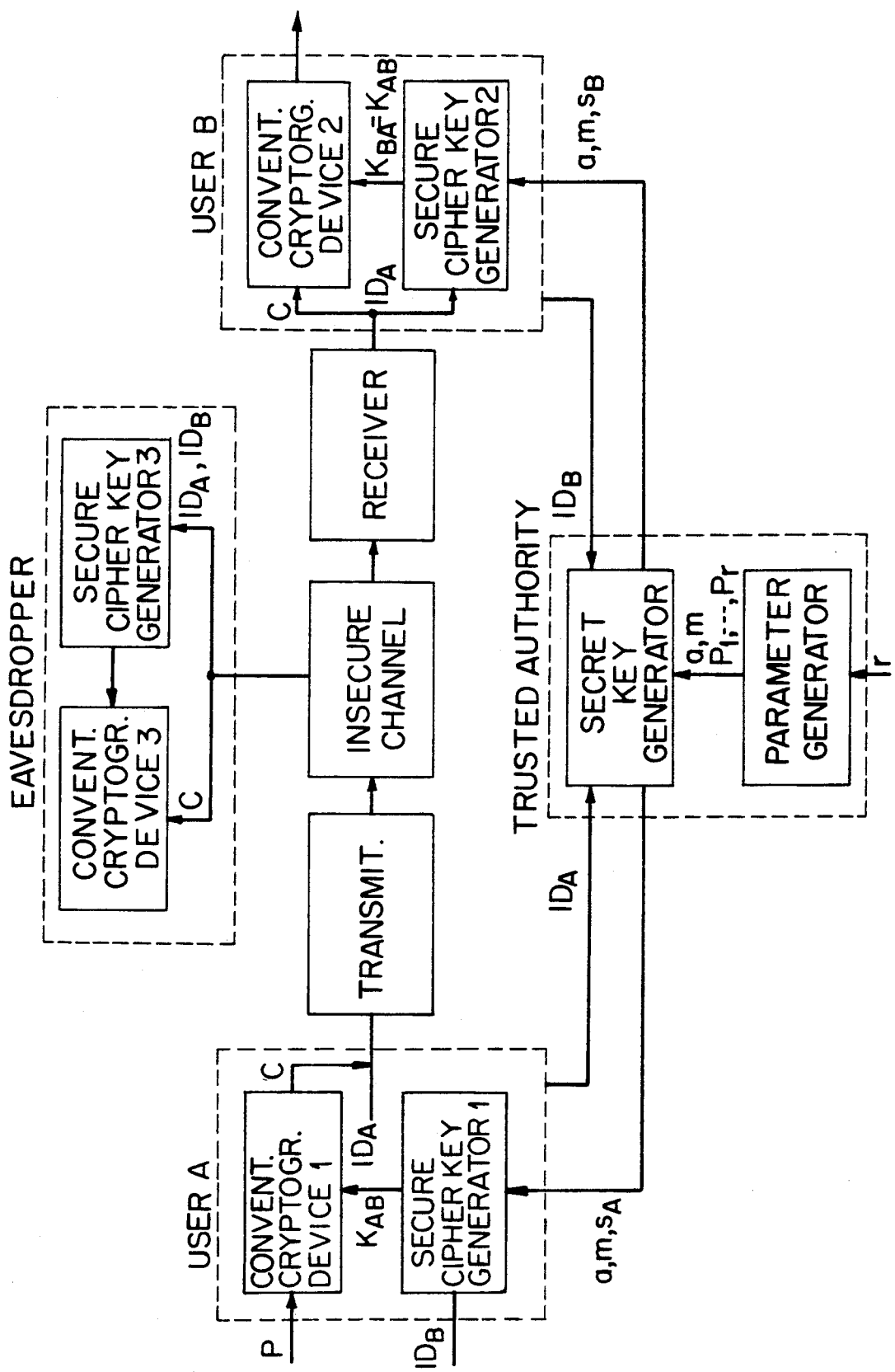

CRYPTOGRAPHIC SYSTEM ALLOWING ENCRYPTED COMMUNICATION BETWEEN USERS WITH A SECURE MUTUAL CIPHER KEY DETERMINED WITHOUT USER INTERACTION

FIELD OF INVENTION

This invention relates to cryptographic systems, and more particularly to cryptographic systems using identity-based information as public keys.

BACKGROUND OF THE INVENTION

Cryptographic systems are widely used to ensure the privacy and authenticity of messages transmitted over public communication channels, such as telephone lines. One type of cryptographic system, generally known as a privacy cryptosystem, prevents extraction of information by unauthorized parties from messages transmitted over such an insecure communication channel, thus assuring a sender that a message being sent is read only by an intended receiver. Another type of cryptographic system, generally known as an authentication cryptosystem, prevents undetected alteration or unauthorized injection of messages into the insecure communication channel, assuring an intended receiver of the authenticity of an intended message. Cryptographic systems are heavily relied on in military, diplomatic and business communications of information, including voice, picture and text data.

A conventional type of privacy cryptosystem allows a sender to transmit a plaintext message P over, for instance, a telephone line to a receiver. At the sender's site, an encryption device encodes with a secret key the plaintext message P into a ciphertext message C, which is then transmitted. At the receiver's site, a decryption device decodes the ciphertext message C with the secret key back into the plaintext message P. The secret key is one known only to the two conversers. Given this secret key, the transformations on the message can be performed, without the secret key the transformations cannot, even with the most powerful computers known to mankind. Thus for an enemy eavesdropper, who wants to decipher the message and yet is assumed to have no information about the secret key, it is infeasible to determine the plaintext message P corresponding to a given ciphertext, or to determine the secret key even if he were given matching plaintext/ciphertext pairs. But one problem with this system is that it requires the distribution of secret keys to the communicating parties. This is often done over a secure channel such as priority mail, or in advance by a trusted courier, which can be expensive, or impossible, as in many military applications.

U.S. Pat. No. 4,200,770, issued to Diffe and Hellman, teaches a well-known public key distribution system, allowing two parties to agree on a secret key even if they do not share any secret initially and even if an enemy eavesdropper can listen to their entire communication over the insecure communication channel. In order to do so, both parties independently and randomly select a secret key which they store in their system secretly. Each party then transforms their secret key into a corresponding public key so it is infeasible for an enemy to reverse the transformation process to find out their respective secret keys. The public keys are then exchanged over the insecure communication channel. (Alternatively, a public directory service provides a listing of all the previously registered public keys, again accessed over a channel that is assumed to be insecure.) In order to generate a mutual secure cipher key each converser performs a transformation involving its own secret key and the other party's public key. At the sender's site, the encryption device encodes with the mutual secure cipher key a plaintext message P into a ciphertext message C, which is then transmitted. At the receiver's site, the decryption device decodes the ciphertext message C with the mutual secure cipher key back into the plaintext message P. Unlike the previous system described, the public key is readily available to all users of the communication channel. The system has the important property that even though the enemy eavesdropper knows a user's public key on the communication channel, it is infeasible to generate the user's secret key. Moreover, even if the enemy eavesdropper knows the sender's public key and the receiver's public key, it is still infeasible to generate the mutual secure cipher key. See also Diffie and Hellman, *New Directions In Cryptography,* IEEE Trans. on Inform. Theory, volume IT-22, November 1976.

However, a disadvantage of the Diffe-Hellman system is that the enemy eavesdropper may impersonate a given user by claiming that the enemy eavesdropper's public key is the user's public key. Thus the public keys of any given user must be capable of being verified or authenticated by a communicating party. This is known in the art as the authenticity problem. As one way of identifying public keys, a trusted authority digitally signs user public keys, so that after exchanging the public keys, the communicating parties can check the signature and verify the authenticity of the communicating parties public key. See Rivest, Shamir and Adleman, *A Method For Obtaining Digital Signatures And Public-key Cryptosystems,* Communications of the ACM, volume 21 (1978). This system although solving the authenticity problem, still suffers from the disadvantage of being interactive, i.e. users must exchange public information before being able to generate the mutual secure cipher key. A major disadvantage of a user interactive communication system is that many important applications do not allow for an interactive protocol (e.g., electronic mail, many military and diplomatic applications). Another disadvantage of an interactive system is that they are much less efficient, and much more expensive because of the required interaction.

In another system known as an identity-based signature system, the need to authenticate a user's public key does not arise because the public key consists entirely of publicly known information, encoded as such with a user's name, address, physical description, etc. See Shamir, *Identity-Based Cryptosystems And Signature Schemes,* CRYPTO '84, Lecture Notes in Computer Science, Volume 196, New York, N.Y.: Springer Verlag (1985). This publicly known information does not need to be authenticated and is referred to as the user's identity. However this system is a digital signature system that cannot be used as a privacy cryptosystem.

Moreover, the idea of using identity-based information as part of the public key in a public key distribution system has been proposed. See Tsujii and Itoh, *An ID-based Cryptosystem Based On The Discrete Logarithm Problem,* IEEE J. on Selected Areas in Communications, volume 7, no. 4, May (1989); Gunther, *An Identity-based Key-exchange Protocol,* presented at Eurocrypt'89, Houthalen, Belgium, (1989); Koyama and Ohta, *Identity-based Conference Key Distribution Sys-* tems, Proceedings CRYPTO'87, Lecture Notes in Computer Science, volume 293, New York, N.Y.: Springer Verlag (1988); and Okamoto and Tanaka, *Key Distribution Based On Identification Information*, IEEE J. on Selected Areas in Communications, volume 7, May (1989). In these systems, a trusted authority is used to issue users' secret keys. This solves the problem of verifying the authenticity of a certain user's public key. These systems are known in the art as identity-based public key distribution system. But a disadvantage of these approaches is that they require user interaction for the exchange of the public key. Some other disadvantages are as follows: Some of the methods require too much computation for being truly practical and are not sufficiently efficient for most applications. See Koyama and Ohta, *Identity-based Conference Key Distribution Systems*, Proceedings CRYPTO'87, Lecture Notes in Comp. Science, volume 293, Springer Verlag (1988) and Tsujii and Itoh, *An ID-based Cryptosystem Based On The Discrete Logarithm Problem*, IEEE J. on Selected Areas in Communications, volume 7, no. 4, May 1989. The Koyama and Ohta approach has been demonstrated to be insecure. The Tsujii and Itoh approach offers the potential for non-interactive user communication but requires a very large amount of computation and is insecure when too many users collaborate in order to determine other users' secret keys.

SUMMARY OF THE INVENTION

In summary, the invention provides a cryptographic system which allows encrypted communication between users with a secure mutual cipher key determined without user interaction.

A secret key generator for a trusted authority means in the cryptographic system comprising means for receiving publicly-known user identity $ID_A$ suitably transformed from a publicly-known user identification information for a user A, and further comprising secret key generator means for transforming the user identity $ID_A$ into secret key $s_A$ for the user A with the inverse of the exponentiation function:

$$a^{s_A} \equiv (ID_A)^2 \pmod{m},$$

that is solved for $s_A$, where a is a publicly-known base parameter, where m is a publicly-known modulus parameter, where m is a number that is the product of r suitably chosen distinct prime numbers $p_1, p_2, \ldots p_r$ and represented by $m = p_1 * p_2 * \ldots * p_r$ where $p_1, p_2, \ldots, p_4$ are secret system prime numbers. The inverse of the exponentiation function is infeasible to compute in order to calculate the secret key $s_A$ without knowing the secret system prime numbers $p_1, p_2, \ldots, p_r$. The secret key $s_A$ enables user A to communicate securely with a user B having a publicly-known user identity $ID_B$ with a mutual secure cipher key $K_{AB}$, defined by the equation:

$$K_{AB} \equiv (ID_B)^{2s_A} \pmod{m}.$$

The mutual secure cipher key $K_{AB}$ is determined without previous interaction with the user B.

In operation, a transmitting user T will send a plaintext message P to a receiving user R with identity $ID_R$. In order to do so, transmitting user T's secure cipher key generator transforms a secret key $s_T$, the public system parameters base a and modulus m, and receiving user R's identity $ID_R$ into a secure mutual cipher key $K_{TR}$, defined by the equation:

$$K_{TR} \equiv (ID_R)^{2s_T} \equiv (ID_R^2)^{s_T} \equiv (a^{s_R})^{s_T} \equiv a^{s_R s_T} \pmod{m}.$$

Transmitting user T's cryptographic device receives the secure mutual cipher key $K_{TR}$ and enciphers the plaintext message P in the ciphertext C. Ciphertext C together with user T's identity $ID_T$ are transmitted to the receiving user R over the unsecure communication channel by using the transmitter.

In order for a receiving user R to decipher the ciphertext C, receiving user R's secure cipher key generator takes its secret key $s_R$, user T's identity $ID_T$, the same public system parameters base a and modulus m, and generates a secure mutual cipher key $K_{RT}$, defined by the equation $$K_{RT} \equiv (ID_T)^{2s_R} \pmod{m},$$

which is by a completely analogous equation as for the secure mutual cipher key $K_{TR}$ above shown to satisfy $$K_{RT} \equiv a^{s_T s_R} \equiv a^{s_R s_T} \pmod{m}.$$

Using the fact that $K_{TR} = K_{RT}$, receiving user R's cryptographic device 2 can decipher the received ciphertext C with the agreed conventional cryptosystem and the secure mutual cipher key $K_{RT}$ to generate as its output the plaintext message P.

Accordingly, an object of this invention is to enable a transmitting user to communicate a message enciphered by a secure mutual cipher key determined without any previous interaction with a receiving party or a trusted authority.

A feature of the present invention is that it has applications in two-way cryptographic communication, as well as one-way cryptographic communication.

BRIEF DESCRIPTION OF THE DRAWING

FIG. 1 is a block diagram of a cryptographic system having two users communicating over an insecure communication channel, a trusted authority and an enemy eavesdropper.

DESCRIPTION OF THE PREFERRED EMBODIMENT

FIG. 1 shows a cryptographic system in which user A communicates with user B over an unsecured communication channel, for example over telephone lines. The system is adapted with a trusted authority (for example, a government organization or a telephone company), which provides means discussed below for securing the integrity of the communication between users A and B against an enemy eavesdropper who is technologically capable of intercepting communication over the unsecured communication line.

When the system is first setup, the trusted authority receives a system input parameter r, which is the number of secret system parameters (explained in detail below) into its parameter generator, which then generates public system output parameters base a and modulus m and secret system output parameters $p_1, p_2, \ldots, p_r$. The secret key generator receives and later uses these parameters to generate a separate secret key for each system user.

Each user can register with the trusted authority by providing user identity information consisting of names, address, physical and passport identification information, and by proving their identity to the trusted authority, for example by showing a passport. (For the purpose of this discussion only 2 users A and B and one insecure communication channel connecting them are shown in FIG. 1 for the sake of simplicity.) The trusted authority receives user identity information $ID_A$ for user A and $ID_B$ for user B in a secret key generator. The secret key generator generates and assigns a secret key corresponding to the user identity information. User A receives the secret key $s_A$ corresponding to his identity information $ID_A$, and user B receives the secret key $s_B$ corresponding to his identity information $ID_B$. This is the identity-based aspect of the overall cryptographic system. Each user must keep the secret key secret to insure the integrity of the system. The trusted authority also provides every user with the public system parameters base a and modulus m which need not be kept secret by the users. The trusted authority need not keep track of the issued secret keys and, for security reasons, erases all provided secret keys. After users have registered, no further interaction with the trusted authority is required. In fact, when no further users need to join the communication network, the trusted authority could even close itself down, erasing all secret system parameters. The system can also be adapted for securing communications between users that are computers. The scope of the invention should not be limited to users as persons. For instance, in one such cryptographic system envisioned, a user can be any receiving and/or transmitting station which may be operated either automatically or by a person.

In order to send securely a plaintext message P over an unsecured communication channel to another user B, user A's secure cipher key generator 1 receives as an input the identity $ID_B$ of user B (which is known to user A) as well as the public system parameters a and m and the secret key $s_A$ of user A (received during registration), and generates a secure cipher key $K_{AB}$. No one except the intended receiver B of the message can feasibly generate the secure cipher key $K_{AB}$. User A's cryptographic device 1 receives the secure cipher key $K_{AB}$, enciphers the plaintext message P, using an agreed upon conventional privacy cryptosystem, and outputs a ciphertext C. For example, the cryptographic device may include the commonly used Data Encryption Standard. See Denning, *Cryptography And Data Security*, Reading, Mass.: Addison-Wesley (1982). Using the transmitter (e.g., a standard modem) user A sends the ciphertext C together with its identity number $ID_A$ over the insecure channel to user B's receiver (e.g., again a standard modem).

In order to recover the plaintext message P, user B's secure cipher key generator 2 receives as an input the identity $ID_A$ of user A as well as the public system parameters a and m and user B's secret key $s_B$ received during registration, and generates the secure cipher key $K_{AB}$. User B's cryptographic device 2 receives as inputs the ciphertext C and the secure cipher key $K_{AB}$ and deciphers the plaintext message P using a decryption algorithm corresponding to the encryption algorithm implemented in user A's cryptographic device 1.

The overall cryptographic system includes the three fundamental steps: the system setup, user registration and user communication. A specific description of preferred embodiments of the invention will follow.

System Setup:

The overall security of the system is set up by the trusted authority, which initially receives a system input parameter r, a small positive integer number, which is the number of secret system prime factors. The trusted authority's parameter generator then generates the r secret system prime factors $p_1, p_2, \ldots, p_r$, which are suitably chosen large prime numbers (as explained below). The prime numbers $p_1, p_2, \ldots, p_r$ satisfy the additional condition that the numbers $(p_1-1)/2, \ldots, (p_r-1)/2$ are pairwise relatively prime odd numbers. This step can be performed using one of the standard techniques described in Maurer, *Fast Generation Of Secure RSA-moduli With Almost Maximal Diversity*, presented at Eurocrypt '89, Houthalen, Belgium (1989), and Rabin, *Probabilisitic Algorithms For Testing Primarilty*, J. of Number Theory, volume 12 (1980).

Next, the trusted authority's parameter generator generates the public system parameter base a, which is a so-called primitive element of given finite fields $GF(p_1), \ldots, GF(p_r)$, to be used as the base of an exponential function. See Lipson, *Elements Of Algebra And Algebraic Computing*, Benjamin/Cummings (1981). It also generates the public system parameter modulus m, where m is a number that is the product of n suitably chosen distinct prime factors $p_1, p_2, \ldots, p_r$, symbolically represented as $m = p_1, p_2^* \ldots * p_3$ to be used as the modulus of the exponential function.

User Registration:

After the setup by the trusted authority, a user who wants to join the network (for example user A) contacts the trusted authority and identifies themself, for example with a passport. User A's is assigned an identity number $ID_A$ which represents his name and possibly other identification information such as a physical description or passport number. It satisfies the condition that $123\ ID_A < m$. A suitable algorithm for transforming names into identity numbers would be publicly known to all users as well as others as a standard method for representing text as numbers. For example, $ID_A$ could be the number whose binary representation corresponds to the ASCII code of user A's name written in English letters. In a preferred embodiment, the transformation would also introduce redundancy (e.g., by writing the name twice) and include a publicly known mixing transformation in order to prevent a user from claiming particular user identity information that results in a desired ID number. This might give an enemy the power of determining the secret system parameters which would compromise the security of the system.

In order to generate user secret keys, the trusted authority generates using a secret key generator a unique list of r numbers $1_{A1}, \ldots, 1_{Ar}$, where each $1_{Ai}$, for $i=1, 2, \ldots, r$, satisfies the equations:

$$0 \leq 1_{Ai} < p_i - 1$$

and $$a^{1_{Ai}} \equiv (ID_A)^2 \pmod{p_i}.$$

An equation of the form $x \equiv y \pmod{w}$ means that the remainders of x and y, when divided by w, are the same or, equivalently, that $y - x$ is a multiple of w (possibly zero or a negative). The reason why user identity $ID_A$ is squared is that a randomly selected number is not guaranteed to have a discrete logarithm, whereas the square of the number is. In alternative embodiments any even power could be used. The numbers $1_{A1}, \ldots, 1_{Ar}$ are generated by one of the well-known algorithms for computing discrete logarithms in finite fields $GF(p)$.

Such an algorithm is feasible when the prime numbers $p_1, \ldots, p_r$ are not too large. See Coppersmith, Odlyzko and Schroeppel, *Discrete Logarithms in GF(p)*, Algorithmica, volume 1 (1986). An important feature of this preferred embodiment is that the user identity $ID_A$ is then squared in order to ensure that such numbers $l_{Ai}$ exist. The trusted authority then computes the unique secret keys $s_A$, which satisfies for $i = 1, 2, \ldots, r$, the equations $$0 \leq s_A < 2^{-r+1}(p_1-1)(p_2-1) \ldots (P_r-1)$$

and $$s_A \equiv l_{Ai} \pmod{p_i-1}.$$

See a standard Chinese remainder method described in Lipson, *Elements Of Algebra And Algebraic Computing*, Benjamin/Cummings (1981). The secret key $s_A$ then satisfies the equation $$a^{s_A} \equiv (ID_A)^2 \pmod{m},$$

i.e., it is the discrete logarithm of the squared identity modulo m with respect to the base a. One important property of this embodiment is that the trusted authority can compute the discrete logarithm of $(ID_A)^2$ modulo each prime factor $p_i$ individually and combine the individual results using the Chinese remainder technique. For an enemy eavesdropper not knowing the prime factors this same task is infeasible. In other words, when the primes $p_1, \ldots, p_r$ are suitably chosen (see below for a specific example), it is feasible for the trusted authority to compute $s_A$ using the above described method, but is completely infeasible for an enemy eavesdropper not knowing the prime factors of modulus m to determine $s_A$ when given $ID_A$. An infeasible task is considered as such because its cost as measured by either the amount of memory or the computing time is finite but impossibly large, for example, on the order of approximately $10^{20}$ operations. One skilled in the art would interpret the operation of taking $ID_A$ into $s_A$ as the inversion of a trapdoor one-way function, which is exponentiation modulo a composite number where the trapdoor is the factorization of the modulus m. See Diffie and Hellman, *New Directions In Cryptography*, IEEE Trans. on Inform. Theory, volume IT-22, November 1976 for a definition of a trapdoor one-way function. In the described preferred embodiment the trapdoor one-way function has the argument of the function as the exponent rather than the base, and thus is a novel cryptographic trapdoor one-way function. Compare Rivest, Shamir and Adleman, *A Method For Obtaining Digital Signatures An Public-key Cryptosystems*, Communications of the ACM, volume 21 (1978).

To complete the user registration, the trusted authority then provides to user A the public system parameters base a, modulus m, and its secret key $s_A$, which is kept secret by user A.

User Communication:

In operation, in order for a transmitting user A to send a plaintext message P to a receiving user B with identity $ID_B$, user A's secure cipher key generator 1 takes as an input user B's identity $ID_B$, the public system parameters base a and modulus m, and the secret key $s_A$, to generate the secure cipher key $K_{AB}$, defined by the equation:

$$K_{AB} \equiv (ID_B)^{2s_A} \equiv (ID_B^2)^{s_A} \equiv (a^{s_B})^{s_A} \equiv a^{s_B s_A} \pmod{m}.$$

User A's cryptographic device 1 receives the secure cipher key $K_{AB}$ and enciphers the plaintext message P in the ciphertext C. Ciphertext C together with user A's identity $ID_A$ are transmitted to user B over the insecure channel by using the transmitter.

In order to decipher the ciphertext C, user B's secure cipher key generator 2 takes as inputs user A's identity $ID_A$, the same public system parameters base a and modulus m, and its secret key $s_B$, to generate the secure cipher key $K_{BA}$, defined by the equation $$K_{BA} \equiv (ID_A)^{2s_B} \pmod{m},$$

which is by a completely analogous equation as for $K_{AB}$ above shown to satisfy $$K_{BA} \equiv a^{s_A s_B} \equiv a^{s_B s_A} \pmod{m}.$$

The reason that $K_{AB} = K_{BA}$ is that multiplication is commutative, i.e. $s_A s_B = s_B s_A$. Because of this equality, user B's cryptographic device 2 can decipher the received ciphertext C with the agreed conventional cryptosystem and secure cipher key $K_{BA}$ to generate as its output the plaintext message P.

The method for generating a secure cipher key jointly shared by users A and B has the property that the generated key is the same each time the method is used. This has the consequence that two users would in each application of the system be using the same cipher key $K_{AB}$, which may be undesirable. As a solution to this problem in a preferred embodiment, there exist several randomization techniques to prevent this, one of them being that user A chooses a random number R and raises $K_{AB}$ to the power R modulo m which is then used as the secure cipher key instead of $K_{AB}$ itself. User A transmits this random number R also to user B together with the numbers $ID_A$ and the ciphertext C. User B can generate the secure cipher key by raising $K_{BA}$ to the power R.

For the purpose of analyzing the security of a cryptographic system, the enemy eavesdropper is assumed in general to have a secure key generator 3 and a conventional cryptographic device 3 available, both identical to those used by users A and B. The security of the system does hence not rely on users A and B having a computational advantage, but only on the fact that they each posses a piece of information the eavesdropper is unable to obtain or compute. The eavesdropper could in theory determine the cipher key $K_{AB}$ by determining $S_A$ by simply trying all possible values $s_A = 1$, $s_A = 2$, etc. but this is completely infeasible. Also more advanced methods for computing discrete logarithms are infeasible when the prime numbers $p_1, \ldots, p_r$ are suitably chosen (see below).

One of the most important aspects of the invention is that the primes $p_1, \ldots, p_r$ are chosen such that computing discrete logarithms modulo each of the primes is feasible, but such that computing discrete logarithms modulo their product m is infeasible. There are two different preferred embodiments for suitably choosing the prime factors. The first is to choose each prime factor sufficiently small, e.g. having not more than 60-70 decimal digits. This allows the trusted authority to compute the discrete logarithm by one known method described by Coppersmith, Odlyzko and Schroeppel, *Discrete Logarithms in GF(p)*, Algorithmica, volume 1 (1986). A second way is to choose each prime factor $p_i$ of a special form, namely such that $p_i-1$ has only prime factors of moderate size, e.g. having 15 decimal digits. This allows the trusted authority to compute the discrete logarithm by using a method described by Pohlig and Hellman, *An Improved Algorithm For Computing Logarithms Over GF(p) And Its Cryptographic Significance,* IEEE Trans. on Information Theory, volume It-24, January, 1978. In choice one described above, in a preferred embodiment $r=3$, and $p_1$, $p_2$ and $p_3$ are three different prime numbers having 60–70 decimal digits. In addition the three prime numbers $(p_1-1)/2$, $(p_2-1)/2$ and $(p_3-1)/2$ could be chosen to be prime numbers themselves. The modulus m is thus a number of approximately 180–210 decimal digits. In choice 2 described above, $r=2$ where $p_1$ and $p_2$ are prime numbers of about 100 decimal digits and where $p_1-1$ and $p_2-1$ both contain at least one prime factor of 13 decimal digits, but none with more digits.

For all the above choices it is infeasible for an enemy to compute the prime factor $p_1, \ldots, p_r$ when given the modulus m. This is even true in light of the best known algorithms available which include those described by Lenstra, *Factoring Integers With Elliptic Curves,* Annals of mathematics, volume 126 (1987) and Riesel, *Prime Numbers And Computer Methods For Factorization,* Stuttgart: Birkhäuser, 1985.

Moreover other significant advantages are gained by this system by allowing implicit authenticity and non-interactive generation of secure mutual cipher keys. The authenticity problem is solved by the fact that the user identity is chosen as the public key. No interaction is required by using a secure mutual cipher key that solely depends on a user secret key assigned by the trusted authority and the other communicating party's identity.

Alternative Method
For Identification Number Assignment:

In the special case where the number r of prime factors is equal to 2, there is another way besides squaring described above that allows the trusted authority to guarantee that the identity number $ID_A$ of a user A has the special property that it has a discrete logarithm to the base a modulo m, even when the factorization is unknown. Since the users do not know this factorization, this is an important step for achieving non-interactive secure transmission of messages. This can be achieved by exploiting a special property of the so-called Jacobi symbol, by defining a user's identity number in a way that assures both that every user can determine this ID number without any interaction and that this ID number has a discrete logarithm modulo m with base a. The Jacobi symbol denoted $(x|m)$ is equal to 1 if and only if the discrete logarithm of the number x modulo the number m exists, and it is equal to $-1$ else. See Riesel, *Prime Numbers And Computer Methods For Factorization,* Stuttgart: Birkhäuser (1985). Since the Jacobi symbol is easy to compute, the identity number of a user can thus be defined as the smallest integer number $ID_A$ that is greater or equal to the representation of the name and whose Jacobi symbol $(ID_A|m)$ is equal to 1. In operation, the user and the trusted authority can determine this identification number $ID_A$ by consecutively checking the integer number starting at the number representing the name.

Illustrative Example:

An example using numbers that are much smaller than those that would be used in a practical implementation is helpful in following the above description of the new invention. Let $r=2$, $p_1=11$, $p_2=13$ and thus $m=143$ and let $a=2$, which is a primitive element in GF(11) as well as GF(13). Taking $ID_A=93$, one obtains $ID_A \equiv 5 \pmod{11}$ and $ID_A \equiv 2 \pmod{13}$ and thus $(ID_A)^2 \equiv 25 \equiv 3 \pmod{11}$ and $(ID_A)^2 \equiv 4 \pmod{13}$. Therefore $1_{A1}=8$ because $2^8 \equiv 256 \equiv 3 \pmod{11}$ and $1_{A2}=2$ because $2^2 \equiv 4 \pmod{13}$. Thus $s_A=38$ as follows from $38 \equiv 8 \pmod{10}$ and $38 \equiv 2 \pmod{12}$. Similarly for $ID_B=68$ one obtains $1_{B1}=2$ and $1_{B2}=8$ and thus $s_B=32$. The secure cipher key is obtained by user A by computing $68^{2*38} \equiv 42 \pmod{143}$ and by user B by computing $93^{2*32} \equiv 42 \pmod{143}$.

Identification Protocol:

The present invention can also be used to set up an identification protocol. A user can prove its identity by proving that it possesses the secret key corresponding to its identity without revealing it. For instance, assume that user A wants to prove its identity to a person B (not necessarily a user). This is achieved by repeating the following well-known protocol a sufficient number of times (for example 20 times). User A chooses a random number r and sends a number $a^r \pmod{m}$ to B. B then randomly selects a binary variable b, i.e., b is equally likely chosen to be 0 or 1. B sends the binary variable b to A as a challenge. The message sent back by A depends on variable b: If $b=0$, A sends r, thereby proving that he actually knew the discrete logarithm of the number sent first (and thus was not trying to cheat), and if $b=1$, A sends $r+s_A$, thereby hiding the value of $s_A$ but allowing B to check the equality $a^{r+s_A} \equiv a^r \cdot (ID_A)^2 \pmod{m}$. The reason why B is convinced by such a protocol that the user claiming to be A is indeed A is because at each step, only someone knowing $s_A$ could possibly answer both questions (for $b=0$ and for $b=1$) correctly.

The above description provides the best mode contemplated by the inventor. Modifications and variations are possible without departing from the spirit and scope of the invention.

I claim:

1. Secret key generator in a cryptographic system comprising:

means for receiving secret system prime numbers $p_1$, $p_2 \ldots r$, a publicly-known modulus parameter m, where $m = p_1 * p_2 * \ldots P_r$ and a publicly-known base parameter a;

means for receiving a publicly-known user identity $ID_A$ suitably transformed from publicly-known user identification information from user A; and secret key generator means for generating secret key $s_A$ for the user A by transforming the publicly-known user identity $ID_A$ with the inverse of the exponentiation function $$a^{s_A} \equiv ID_A \pmod{m},$$

that is solved for $s_A$, the inverse of the exponentiation function being infeasible to compute without knowing the secret system prime numbers $p_1, p_2, \ldots, p_r$.

2. Secret key generator as claimed in claim 1, wherein the secret system prime numbers $p_1, p_2, \ldots, p_r$ are in a range of 35 and 150 decimal digits.

3. Secret key generator as claimed in claim 1, wherein the number of secret system prime numbers is between 2 and 5.

4. Secret key generator as claimed in claim 1, wherein the secret system prime numbers $p_1, p_2, \ldots, p_r$ are in the range of 50 and 80 decimal digits, and the number of prime numbers is 3.

5. Secret key generator as claimed in claim 1, wherein the secret system prime numbers $p_1, p_2, \ldots, p_r$ are in the range of 90 and 110 decimal digits, and the number of prime numbers is 2.

6. Secret key generator as claimed in claim 1, wherein the secret system prime numbers $p_i$, for $i=1$ to $r$, are in the special form $p_i-1$ having no large prime factors greater than $10^{15}$.

7. Secret key generator means as claimed in claim 1, wherein the transformation function generating the secret key $s_A$ enables the user A to communicate securely with user B having a publicly-known user identification $ID_B$ to generate a mutual secure cipher key $K_{AB}$ determined without interaction with user B.

8. Secret key generator means for a trusted authority means in a cryptographic system comprising:
   (a) means for receiving secret system prime numbers $p_1, p_2, \ldots, p_r$, publicly-known modulus parameter m where $m = p_1 * p_2 * \ldots * p_r$ and a publicly-known base parameter a, which is a primitive element of given finite fields $FG(p_1), \ldots, GF(p_r)$, and
   (b) means for receiving publicly-known user identity $ID_A$ suitably transformed from user identification information for a user A;
   (c) secret key generator means for transforming the user identity $ID_A$ into a secret key $s_A$ for the user A with the inverse of the exponentiation function $$a^{s_A} \equiv (ID_A)^2 \pmod{m},$$

that is solved for $s_A$, the inverse of the exponentiation function being infeasible to compute without knowing the secret system prime numbers $p_1, p_2, \ldots, P_r$, and the secret key $s_A$ enabling user A to communicate securely with a user B who has a publicly-known user identity $ID_B$ with a mutual secure cipher key $K_{AB}$, defined by the equation:

$$K_{AB} \equiv (ID)_B{}^{2s_A} \pmod{m},$$

the mutual secure cipher key $K_{AB}$ being determined without previous interaction with user B.

9. Secret key generator as claimed in claim 8, wherein the secret system prime numbers $p_1, p_2, \ldots, p_r$ are in a range of 35 and 150 decimal digits.

10. Secret key generator as claimed in claim 8, wherein the number of secret system prime numbers is between 2 and 5.

11. Secret key generator as claimed in claim 8, wherein the secret system prime numbers $p_1, p_2, \ldots, p_r$ are in the range of 50 and 80 decimal digits, and the number of prime numbers is 3.

12. Secret key generator as claimed in claim 8, wherein the secret system prime numbers $p_1, p_2, \ldots, p_r$ are in the range of 90 and 110 decimal digits, and the number of prime numbers is 2.

13. Secret key generator as claimed in claim 8, wherein the secret system prime numbers $p_i$, for $i=1$ to $r$, are in the special form, $p_i-1$ having no large prime factors greater than $10^{15}$.

14. Trusted authority means in a cryptographic system comprising:
   (a) means for suitably transforming publicly-known user identification information for a user A into user identity $ID_A$;
   (b) secret key generator means for transforming the user identity $ID_A$ into a secret key $s_A$ for the user A with the inverse of the exponentiation function $$a^{s_A} \equiv ID_A \pmod{m},$$

that is solved for $s_A$, where a is a publicly-known base parameter, where m is a publicly-known modulus parameter and $m = p_1 * p_2 \ldots * p_r$ and where $p_1, p_2, \ldots, P_r$ are secret system prime numbers, the inverse of the exponentiation function being infeasible to compute without knowing the secret system prime numbers $p_1, p_2, \ldots, p_r$, and the secret key $s_A$ enabling user A to communicate securely with a user B who has a publicly-known user identity $ID_B$ with a mutual secure cipher key $K_{AB}$, defined by the equation:

$$K_{AB} \equiv (ID_B)^{s_A} \pmod{m},$$

the mutual secure cipher key $K_{AB}$ being determined without previous interaction with user B.

15. Trusted authority means as claimed in claim 14, wherein the secret system prime numbers $p_1, p_2, \ldots, p_r$ are in a range of 35 and 150 decimal digits.

16. Trusted authority means as claimed in claim 14, wherein the number of secret system prime numbers is between 2 and 5.

17. Trusted authority means as claimed in claim 14, wherein the secret system prime numbers $p_1, p_2, \ldots, p_r$ are in the range of 50 and 80 decimal digits, and the number of prime numbers is 3.

18. Trusted authority means as claimed in claim 14, wherein the secret system prime numbers number $p_i$, $p_2, \ldots, p_r$ are in the range of 90 and 110 decimal digits, and the number of prime numbers is 2.

19. Trusted authority means as claimed in claim 14, wherein the secret system prime numbers $p_i$, for $i=1$ to $r$, are in the special form, $p_i-1$ having no large prime factors greater than $10^{15}$.

20. Trusted authority means in a cryptographic system comprising:
   (a) system parameter generator means for generating secret system prime numbers $P_1, P_2, \ldots, P_r$, a publicly-known system modulus m, where $m = P_1 * P_2 * \ldots * P_r$, and a publicly-known system base a, which is a primitive element of given finite fields $GF(p_1), \ldots, GF(p_r)$;
   (b) means for receiving publicly-known user identification information from a user A;
   (c) means for suitably transforming the publicly-known user identification information from a user A into a user identity $ID_A$ so that the user identity $ID_A$ has a discrete logarithm modulo m for the base a; and
   (d) secret key generator means for transforming the user identity $ID_A$ into a secret key $s_A$ for the user A with the inverse of the exponentiation function $$a^{s_A} \equiv (ID_A)^2 \pmod{m},$$

that is solved for $s_A$, the inverse of the exponentiation function being infeasible to compute without knowing the secret system prime numbers $p_1, p_2, \ldots, p_r$, and the secret key $s_A$ enabling user A to communicate securely with a user B who has a publicly-known user identity $ID_B$ with a mutual secure cipher key $K_{AB}$, defined by the equation:

$$K_{AB} \equiv (ID_B)^{2s_A} \pmod{m},$$

the mutual secure cipher key $K_{AB}$ being determined without previous interaction with user B.

21. Trusted authority means as claimed in claim 20, wherein the secret system prime numbers $p_1, p_2, \ldots, p_r$ are in a range of 35 and 150 decimal digits.

22. Trusted authority means as claimed in claim 20, wherein the number of secret system prime numbers is between 2 and 5.

23. Trusted authority means as claimed in claim 20, wherein the secret system prime numbers $p_1, p_2, \ldots, p_r$ are in the range of 50 and 80 decimal digits, and the number of prime numbers is 3.

24. Trusted authority means as claimed in claim 20, wherein the secret system prime numbers $p_1, p_2, \ldots, p_r$ are in the range of 90 and 110 decimal digits, and the number of prime numbers is 2.

25. Trusted authority means as claimed in claim 20, wherein the secret system prime numbers $p_i$, for $i=1$ to $r$, are in the special form, $p_i-1$ having no large prime factors greater than $10^{15}$.

26. A cipher key generator means in a cryptographic system for generating a secure mutual cipher key enabling a transmitting user T having a publicly-known identity $ID_r$ to communicate securely with a receiving user R having publicly-known identity $ID_r$ comprising:
    (a) transmitting user input means for receiving a secret key $s_T$ generated by a secret key generator of a trusted authority with the inverse of the exponentiation function $$a^{s_T} \equiv (ID_I)^2 \pmod{m},$$

that is solved for $s_T$, where a is a publicly-known base parameter, where m is a publicly-known modulus parameter and $m = p_1 * p_2 * \ldots * P_r$ and where $p_1, p_2, \ldots, p_r$ are secret system prime numbers, the inverse of the exponentiation function being infeasible to compute in order to calculate the secret key $s_T$ without knowing the secret prime numbers $p_1, p_2, \ldots, p_r$; and
    (b) transmitting user cipher key generator means for transforming the secret key $s_T$ and the receiving user R's publicly-known identity $ID_R$ into a mutual secure cipher key $K_{TR}$, defined by the equation:

$$K_{TR} \equiv (ID_R)^{2s_T} \pmod{m},$$

the mutual secure cipher key $K_{TR}$ being determined without previous interaction with receiving user R.

27. A cipher key generator means as claimed in claim 26, wherein the secret system prime numbers $p_1, p_2, \ldots, p_r$ are in a range of 35 and 150 decimal digits.

28. A cipher key generator means as claimed in claim 26, wherein the number of secret system prime numbers is between 2 and 5.

29. A cipher key generator means as claimed in claim 26, wherein the secret system prime numbers $p_1, p_2, \ldots, p_r$ are in the range of 50 and 80 decimal digits, and the number of prime numbers is 3.

30. A cipher key generator means as claimed in claim 26, wherein the secret system prime numbers $p_1, p_2, \ldots, p_r$ are in the range of 90 and 110 decimal digits, and the number of prime numbers is 2.

31. A cipher key generator means as claimed in claim 26, wherein the secret system prime numbers $p_i$, for $i=1$ to $r$, are in the special form, $p_i-1$ having no large prime factors greater than $10^{15}$.

32. A cipher key generator means as claimed in claim 26, which further comprises identification protocol means, including a first means for choosing a random number r and sending a number $a^r \pmod{m}$ to receiving user R, a second means for receiving a binary variable b in the form of "0" or "1" from user R, and a third means for sending back to the user R the random number r if variable b equals "0", or sending the number r plus secret key $s_T$ if variable b equals "1", thereby concealing the value of the secret key $s_T$ while allowing the user R to check the equality of the equation: $a^{r+s_T} \equiv a^r \cdot (ID_T)^2 \pmod{m}$ to confirm user T's identity.

* * * * *